(12) United States Patent  
Giallorenzi et al.

(10) Patent No.: US 9,130,689 B1  
(45) Date of Patent: Sep. 8, 2015

(54) APPLYING CODE DIVISION MULTIPLEXING TO A BEACON CHANNEL CONTAINING DATA FOR DECODING A CORRESPONDING TRAFFIC CHANNEL

(71) Applicant: L-3 Communications Corp., New York, NY (US)

(72) Inventors: Thomas R. Giallorenzi, Riverton, UT (US); Radivoje Zarubica, Sandy, UT (US); Samuel C. Kingston, Salt Lake City, UT (US); Matthew A. Lake, Salt Lake City, UT (US); David M. Arnesen, West Jordon, UT (US); N. Thomas Nelson, Spanish Fork, UT (US)

(73) Assignee: L-3 Communications Corp., New York, NY (US)

( * ) Notice: Subject to any disclaimer, the term of this patent is extended or adjusted under 35 U.S.C. 154(b) by 168 days.

(21) Appl. No.: 13/900,765

(22) Filed: May 23, 2013

(51) Int. Cl.
*H04B 7/216* (2006.01)
*H04J 13/00* (2011.01)

(52) U.S. Cl.
CPC .................................. *H04J 13/0003* (2013.01)

(58) Field of Classification Search
None
See application file for complete search history.

(56) References Cited

U.S. PATENT DOCUMENTS

| | | | | |
|---|---|---|---|---|
| 6,226,317 | B1 * | 5/2001 | Bruckert et al. | 375/146 |
| 6,263,011 | B1 * | 7/2001 | Paik et al. | 375/149 |
| 7,701,996 | B1 * | 4/2010 | Giallorenzi et al. | 375/130 |
| 8,576,736 | B1 * | 11/2013 | Sigg et al. | 370/252 |
| 2004/0258102 | A1 * | 12/2004 | Callaway et al. | 370/511 |
| 2008/0002618 | A1 * | 1/2008 | Murata et al. | 370/329 |
| 2008/0095108 | A1 * | 4/2008 | Malladi et al. | 370/329 |
| 2010/0309884 | A1 * | 12/2010 | Haverty | 370/331 |
| 2011/0059689 | A1 * | 3/2011 | Haverty | 455/1 |

* cited by examiner

*Primary Examiner* — Anh-Vu Ly
(74) *Attorney, Agent, or Firm* — Kirton | McConkie

(57) ABSTRACT

The present invention is generally directed to using code division multiplexing (CDM) on the beacon and traffic channels while lowering the power of the beacon channel so that it rides under the traffic channel and becomes very difficult to detect. In this way, the beacon channel can contain sensitive information for decoding the traffic channel while remaining hidden from unintended recipients. By hiding the beacon channel, the CDM technique can be particularly beneficial in adaptive waveform systems where sensitive traffic channel acquisition information is regularly transmitted to the receiver.

28 Claims, 8 Drawing Sheets

APPLYING CODE DIVISION MULTIPLEXING TO A BEACON CHANNEL CONTAINING DATA FOR DECODING A CORRESPONDING TRAFFIC CHANNEL

BACKGROUND

A beacon channel is often used to provide critical information for recovering data transmitted in a traffic channel. For example, the beacon channel can contain timing, frequency, or phase information necessary for the receiver to synchronize with a received traffic channel. Once the beacon channel is received, the receiver can extract the information from the beacon channel and use the information to identify and decode the traffic channel.

When the beacon channel is used to transmit the necessary information for decoding the traffic channel, it is critical that the beacon channel be protected to ensure that an unintended recipient cannot gain access to the data in the traffic channel. Most current schemes employ some form of time division multiplexing (TDM) of the traffic and beacon channels. However, when TDM is used, the beacon channel can be relatively easy to detect. Therefore, it can be relatively easy for an unintended recipient to obtain the sensitive information in the beacon channel that is required to decode the traffic channel.

SUMMARY

The present invention is generally directed to using code division multiplexing (CDM) on the beacon and traffic channels while lowering the power of the beacon channel so that it rides under the traffic channel and becomes very difficult to detect. In this way, the beacon channel can contain sensitive information for decoding the traffic channel while remaining hidden from unintended recipients.

In some embodiments, the present invention is implemented as a method for code division multiplexing a traffic channel and a beacon channel that contains acquisition information for acquiring the traffic channel. A code division multiplexed (CDM) traffic channel is generated by using one or more CDM parameters to spread the bandwidth of the traffic channel. The one or more CDM parameters used to spread the bandwidth of the traffic channel are included in a beacon channel. A CDM beacon channel is also generated. Then, the CDM traffic channel and the CDM beacon channel are transmitted to a receiver.

In some embodiments, the present invention is implemented as a method for extracting acquisition information from a code division multiplexed beacon channel to acquire a code division multiplexed traffic channel. A code division multiplexed (CDM) beacon channel that contains acquisition information for de-spreading a corresponding CDM traffic channel is received from a transmitter. The CDM beacon channel is processed to extract the acquisition information. The acquisition information includes one or more CDM parameters used by the transmitter to spread the bandwidth of the CDM traffic channel. The CDM traffic channel is then de-spread using the one or more CDM parameters included in the acquisition information.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Code Division Multiplexing the Beacon and Traffic Channels

In some embodiments of the invention, a transmitter can apply code division multiplexing (CDM) to the beacon and the traffic channels while transmitting the beacon channel at a significantly lower power level than the traffic channel. In this way, the beacon channel is hidden under the traffic channel and is therefore difficult to detect. The beacon channel can therefore contain sensitive acquisition information for acquiring the traffic channel.

Figure 1:
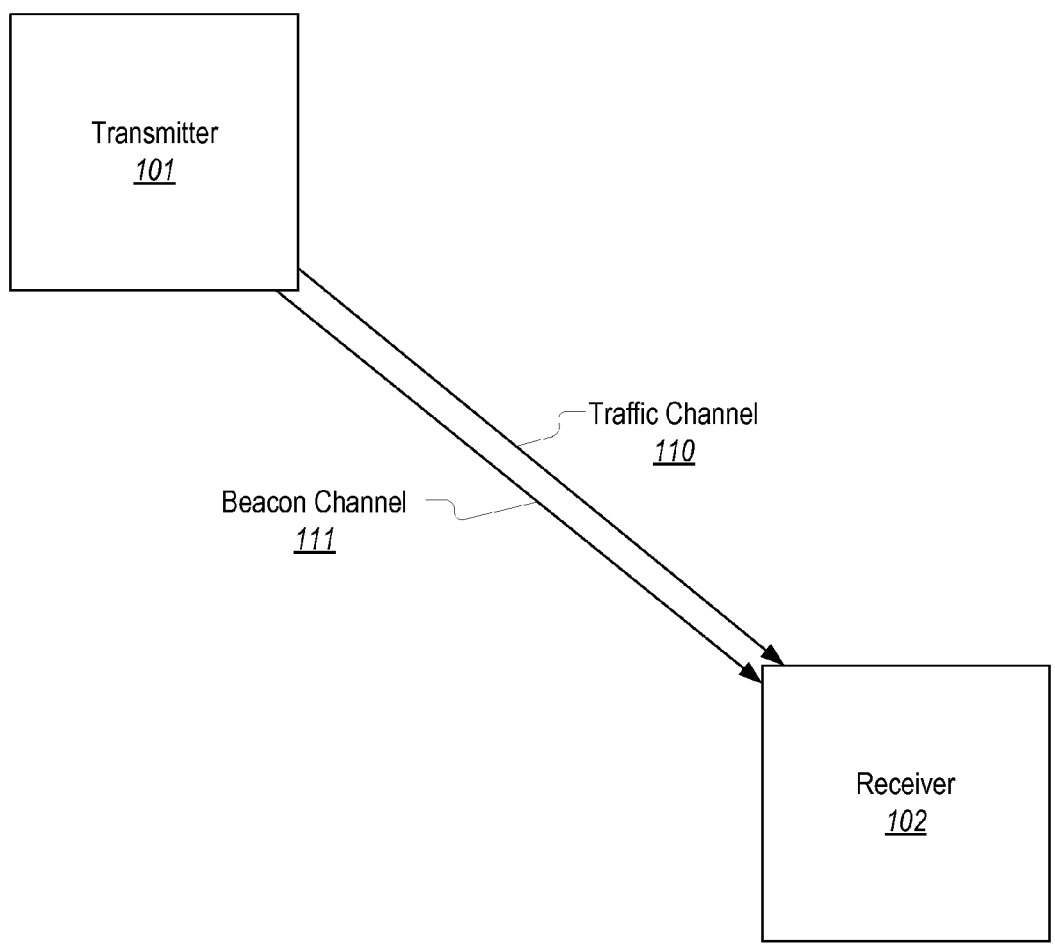
FIG. 1 illustrates an example of a system that includes a transmitter that transmits a traffic channel and a beacon channel to a receiver using CDM.

FIG. 1 illustrates an example of a system in which CDM can be applied to the beacon and traffic channels to accomplish this hiding of the beacon channel. In FIG. 1, a system 100 includes a transmitter 101 and a receiver 102. Transmitter 101 and receiver 102 can represent any type of device or system that is capable of transmitting or receiving electromagnetic waves (e.g. RF signals). Transmitter 101 is shown as transmitting a traffic channel 110 and a beacon channel 111 to receiver 102. Beacon channel 111 can include information necessary to decode the traffic channel 110. Accordingly, when receiving traffic channel 110 and beacon channel 111, receiver 102 can first process beacon channel 111 to extract the necessary information for decoding traffic channel 110. This necessary information (hereinafter referred to as acquisition information) can include any information receiver 102 uses to decode traffic channel 110 whether the information is used to directly decode traffic channel 110 or is used to derive other information which is used to decode traffic channel 110. Examples of acquisition information include timing information, frequency information, phase information, PN codes, PN code seeds, encryption information, error correction information, etc. As will be further described in the Adaptive Waveform section below, in some embodiments, the acquisition information can include parameters for implementing an adaptive waveform system.

As stated above, most current systems use TDM to transmit the traffic and beacon channels. In TDM, the traffic and beacon channels would be alternately transmitted for a period of time such that only a single channel would be transmitted at any given time. In contrast, according to embodiments of the invention, CDM can be used to allow both traffic channel 110 and beacon channel 111 to be transmitted at the same time.

CDM employs spread spectrum techniques which spread the bandwidth of the transmitted signal. Although other types of spread spectrum can be used in embodiments of the present invention, to clarify the description only an example using direct sequence spread spectrum will be described. Other spread spectrum schemes could also be used such as frequency hopping spread spectrum or hybrids of direct sequence and frequency hopping. In any case, as further described below, the beacon channel can include the necessary information for de-spreading the corresponding traffic channel regardless of the spread spectrum technique used on the traffic channel.

Direct sequence spread spectrum (DSSS) employs a code sequence (known as a PN code) having a greater code rate than the carrier signal containing the data. The PN code appears as random noise, but follows a deterministic pattern. The PN code is used to modulate the carrier signal thereby causing the bandwidth of the carrier signal to be increased (i.e. spread).

Each signal to be concurrently transmitted over the same transmission medium can be modulated (or spread) using a different PN code. If the receiver knows the PN code used to spread the transmitted signal, the receiver can de-spread the signal into its original bandwidth to allow the data to be recovered. In some embodiments of the invention, the traffic and beacon channels can be highly spread (e.g. by using a spreading factor of 10,000 or more).

In embodiments of the present invention, both traffic channel 110 and beacon channel 111 can be code division multiplexed (e.g. using direct sequence spread spectrum or another spread spectrum technique) to allow the signals to be transmitted and received simultaneously. The particular manner in which receiver 102 detects and de-spreads beacon channel 111 is not essential to the invention. For example, receiver 102 may have sufficient prior knowledge to detect and de-spread beacon channel 111.

With regards to traffic channel 110, receiver 102 can extract the acquisition information from beacon channel 111 to enable receiver 102 to de-spread traffic channel 110. For example, beacon channel 111 can include a PN code or a PN code seed necessary to de-spread the traffic channel as well as timing information that defines a specific or relative time at which the PN code is to be applied to the spread traffic channel.

Figure 2:
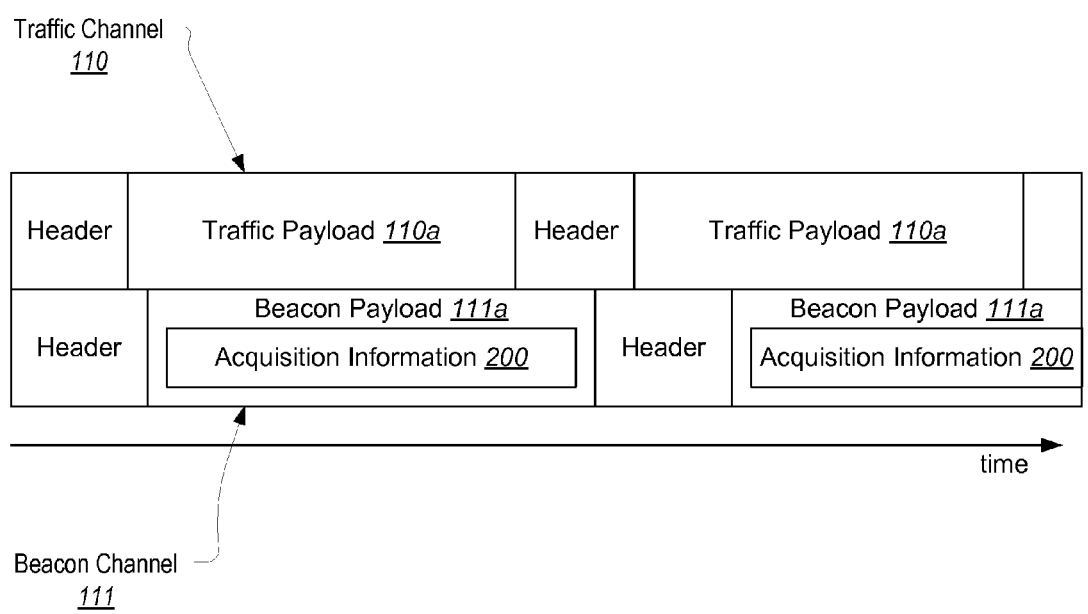
FIG. 2 illustrates a CDM traffic channel and a CDM beacon channel that carries acquisition information for acquiring a corresponding traffic channel.

FIG. 2 illustrates an example of how beacon channel 111 can include acquisition information for traffic channel 110 while being transmitted simultaneously with traffic channel 110 using CDM. As shown, traffic channel 110 comprises a sequence of headers and traffic payload 110a, and beacon channel 111 comprises a sequence of headers and beacon payload 111a. Beacon payload 111a includes acquisition information 200 which is used by receiver 102 to de-spread traffic channel 110.

Because beacon channel 111 contains the sensitive acquisition information, it is desirable to protect the beacon channel from unintended discovery. In some embodiments of the invention, transmitter 101 can hide beacon channel 111 by transmitting beacon channel 111 at a significantly lower power level than traffic channel 110. This is possible because beacon channel 111, prior to spreading, has a much lower data rate (e.g. bits/s) than traffic channel 110. In other words, to ensure a received signal is decodable once it reaches the receiver, the transmitted signal must be transmitted at a sufficiently high power level so that an adequate energy per bit is obtained. Because the bit rate of the beacon channel is much lower than the bit rate of the traffic channel, the adequate energy per bit for the beacon channel can be obtained with a significantly lower power level than is required for the traffic channel.

In some embodiments, the beacon channel can be transmitted with a power level that ranges from the same power level as the traffic channel to a power level based on the processing gain and signal to noise ratio of the traffic channel. In some embodiments, this power level of the beacon channel can be represented by the following equation:

$$P_{Beacon\ Channel} = P_{Traffic\ Channel} - (10 \log 10(PG) - Eb/No)$$

where PG is the processing gain of the traffic channel and Eb/No is the signal to noise ratio of the beacon channel.

In addition to hiding the beacon channel, transmitting the beacon channel at a lower power level also minimizes the interference caused to the traffic channel. For example, because beacon channel 111 and traffic channel 110 are spread over similar bandwidths, they will generally interfere. However, because beacon channel 111 is transmitted at a significantly lower power level, the interference caused by beacon channel 111 on traffic channel 110 is generally negligible. In this way, the fluctuations of traffic channel 110 due to beacon channel 111 are minimized. On the other hand, as stated above, the interference caused by traffic channel 110 on beacon channel 111 is substantial enough to render beacon channel 111 practically undetectable.

In other words, because both traffic channel 110 and beacon channel 111 are spread over a similar bandwidth and transmitted at the same time, and because traffic channel 110 is transmitted at a significantly higher power level than beacon channel 110, beacon channel 111 will be hidden under traffic channel 110. The higher power level of the transmitted traffic channel will dominate the beacon channel thereby making the beacon channel appear as noise. In this way, an unintended receiver may detect the higher power traffic channel in the transmission medium, but will not likely be able to detect the beacon channel that carries the necessary information to de-spread and decode the traffic channel.

In some embodiments, beacon channel 111 may also be encrypted to further increase the difficulty of obtaining the sensitive acquisition information for de-spreading and decoding traffic channel 110. Accordingly, in contrast to schemes which use TDM to transmit the traffic and beacon channels and therefore leave the beacon channel relatively susceptible to detection, the present invention employs CDM to enable the hiding of the beacon channel underneath the traffic channel. In this way, there is a much greater assurance that the sensitive traffic channel acquisition information contained in the beacon channel will remain secret.

Figure 3:
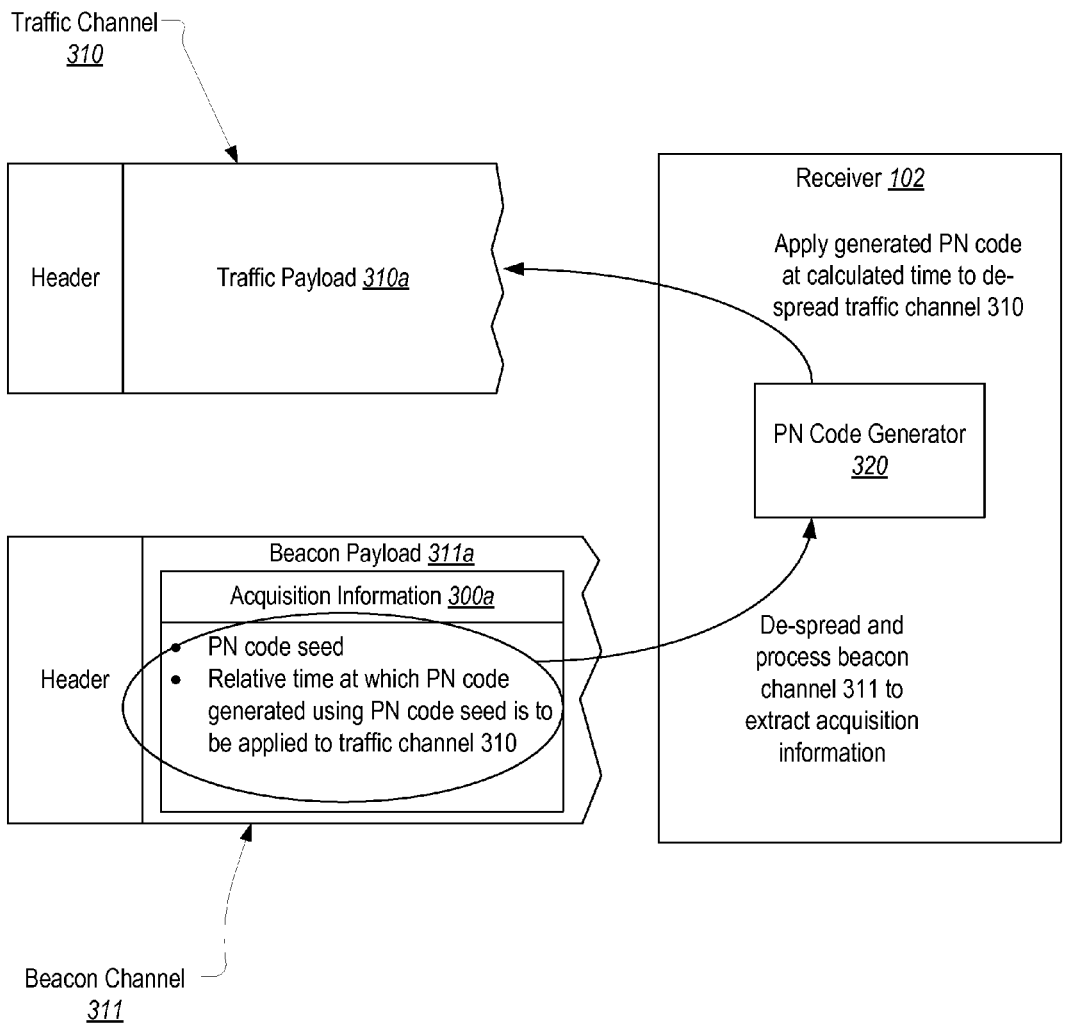
FIG. 3 illustrates an example of a CDM beacon channel that contains a PN code seed and timing information for de-spreading a corresponding CDM traffic channel.

FIG. 3 illustrates a particular example of a beacon channel 311 that includes acquisition information for acquiring a corresponding traffic channel 310. As shown, beacon channel 311 includes beacon payload 311a that includes acquisition information 300a. Acquisition information 300a includes a PN code seed as well as a relative time at which a PN code generated from the PN code seed is to be applied to traffic channel 310 to de-spread traffic channel 310.

When receiver 102 receives beacon channel 311, it de-spreads and processes beacon channel 311 (e.g. using any of various known techniques) to extract acquisition information 300a. A PN code generator 320 in receiver 102 uses the PN code seed to generate a PN code for de-spreading traffic channel 310. Receiver 102 also calculates the time at which the generated PN code should be applied to traffic channel 310. Receiver 102 can then apply the PN code to traffic channel 310 at the calculated time to de-spread traffic channel 310. Once de-spread, traffic channel 310 can be further processed to extract the data in traffic payload 310a.

As can be seen, the beacon channel can be used to transmit sensitive information for acquiring the traffic channel while being hidden underneath the traffic channel using CDM. This technique strengthens the security of the acquisition information which further strengthens the security of the traffic channel.

Using CDM Techniques to Secure the Transmission of Adaptive Waveform Parameters in the Beacon Channel Because the CDM techniques described above provide greater security to the beacon channel carrying the acquisition information for the traffic channel, the present invention can be particularly beneficial in adaptive waveform systems. Adaptive waveform systems dynamically adjust one or more parameters used to generate a waveform prior to transmission. Because the transmitter can dynamically adjust these parameters while transmitting a channel, when a parameter is updated, the transmitter generally must transmit the updated parameter (or some information that the receiver can use to update the parameter) to the receiver to allow the receiver to acquire the channel generated with the updated parameter.

By dynamically adapting the channel, an adaptive waveform system can provide a more accurate and efficient system. However, because updated parameters are transmitted relatively frequently, there is a greater risk that an unintended recipient will gain access to the necessary information for acquiring the channel. The present invention allows these updated parameters to be hidden in the beacon channel thereby reducing the vulnerability of adaptive waveform systems.

Commonly owned U.S. patent application Ser. No. 13/780,154, filed Feb. 28, 2013 and titled "Variable Length Header For Identifying Changed Parameters Of A Waveform Type" describes an example of a scheme for implementing an adaptive waveform system. The parameters described in this scheme are one example of the type of acquisition information that can be contained within the beacon channel when the CDM techniques described above are used. Of course, the CDM techniques of the present invention can be used to secure any other type of traffic channel acquisition data within the beacon channel.

The parameters that can be employed in the adaptive waveform scheme of U.S. patent application Ser. No. 13/780,154 include parameters that identify one or more of the following: an encryption scheme, a forward error correction (FEC) code (e.g., a linear block FEC code, a convolution FEC code, a cyclic redundancy check code, or the like), a modulation scheme (e.g., phase-shift keying, frequency-shift keying, amplitude-shift keying, quadrature phase shift keying, quadrature amplitude modulation, or the like), a data (e.g., symbol) rate, a carrier frequency, an interleaving technique, a code division multiplexing technique (e.g., a chipping rate), and/or the like.

A transmitter implementing an adaptive waveform scheme can include a waveform control module which controls the waveform type of the modulated waveforms (e.g. the traffic channel). The waveform type can be defined by the value to which each parameter used to generate the waveform is set. The waveform control module can set and change the waveform type of a modulated waveform by setting each parameter to a desired value.

According to embodiments of the present invention, when the transmitter initially sets or changes any of the parameters used to generate the traffic channel, the changed parameters can be sent to the receiver using the beacon channel. By employing the CDM techniques of the present invention, these changed parameters remain secure during transmission.

Figure 4:
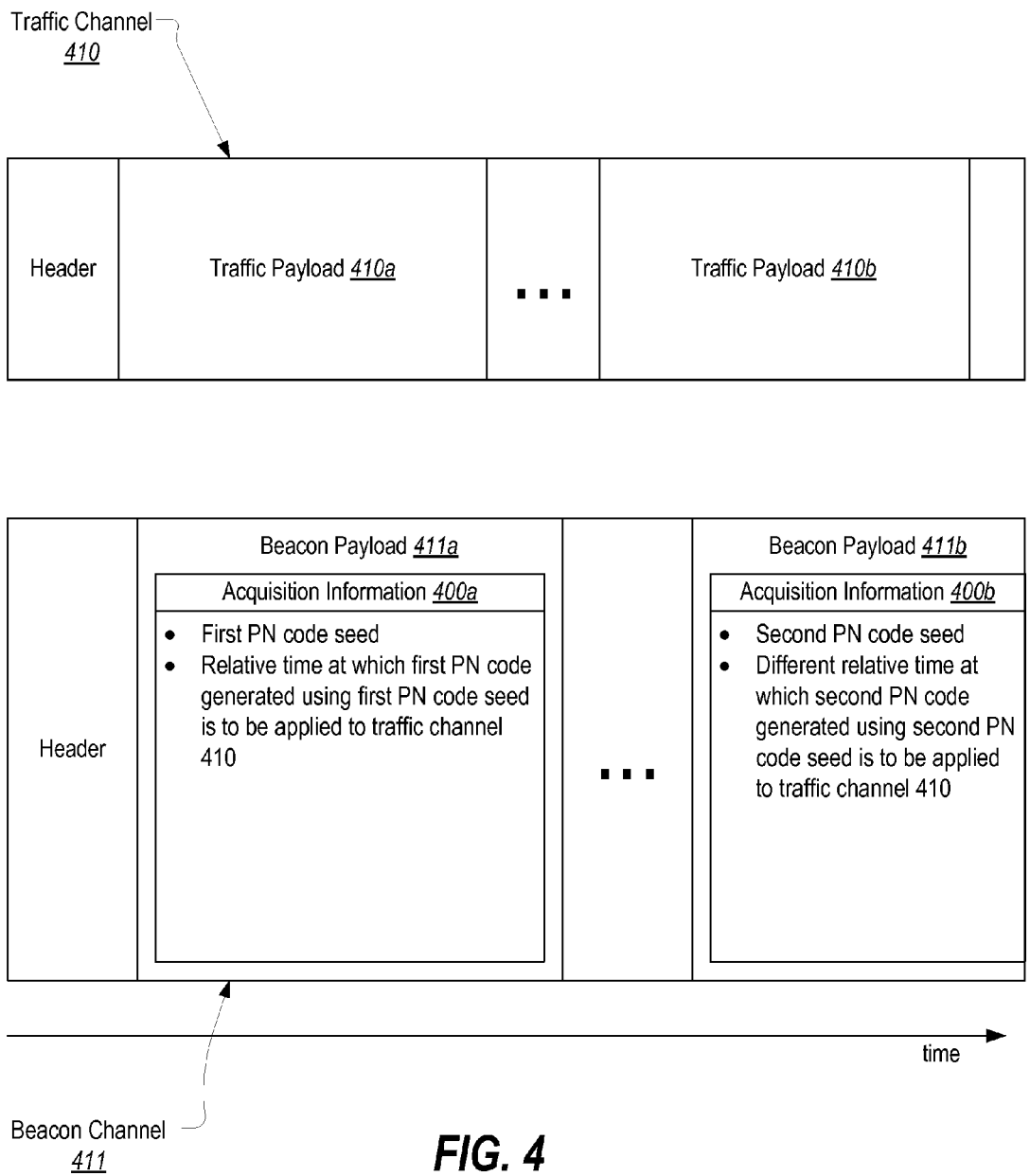
FIG. 4 illustrates an example of a CDM beacon channel that is used to transmit updated parameters that are used to de-spread a corresponding CDM traffic channel.

FIG. 4 demonstrates a case where the transmitter has changed the PN code seed used to spread traffic channel 410, and has included the new PN code seed in beacon channel 411. Specifically, beacon channel 411 includes acquisition information 400a and acquisition information 400b. Acquisition information 400a is transmitted at some time prior to acquisition information 400b. For example, acquisition information 400a can be transmitted initially to indicate to the receiver that traffic channel 410 is initially spread using the first PN code.

Acquisition information 400a includes the first PN code seed and information defining a relative time at which a first PN code generated from the first PN code seed is to be applied to traffic channel 410 to de-spread the channel. The receiver can extract the first PN code seed and use it to de-spread traffic channel 410 for a period of time. Then, when the receiver receives acquisition information 400b, it can determine that the second PN code seed should be used to generate a second PN code that is to be applied to traffic channel 410 at a defined time. Accordingly, the receiver can begin de-spreading traffic channel 410 using the second PN code at the appropriate time as defined in acquisition information 400b.

Because acquisition information 400a and 400b contain sufficient information to allow a receiver to acquire traffic channel 410, it is critical that the information be highly protected. Because beacon channel 411 and traffic channel 410 are code division multiplexed, and beacon channel 411 is transmitted at a substantially lower power level than traffic channel 410, the first and second PN code seeds as well as the timing information remain protected from unintended discovery.

Figure 5:
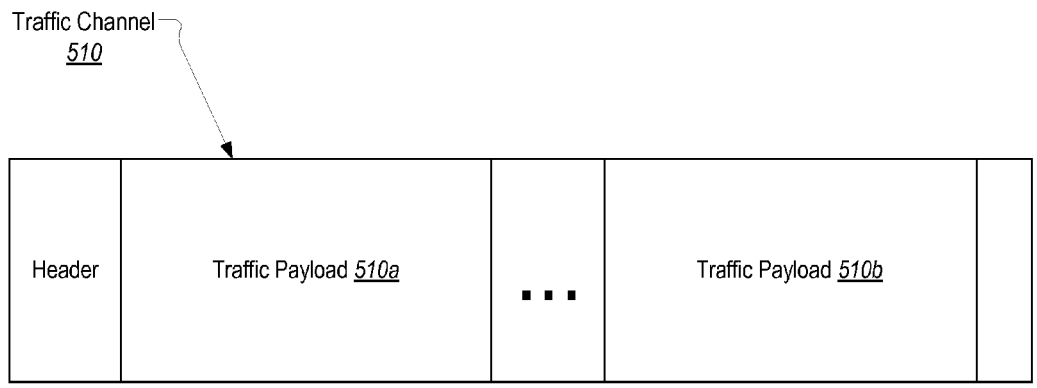
FIG. 5 illustrates an example of a CDM beacon channel that is used to transmit an updated modulation scheme used to demodulate a corresponding CDM traffic channel.
Figure 5:
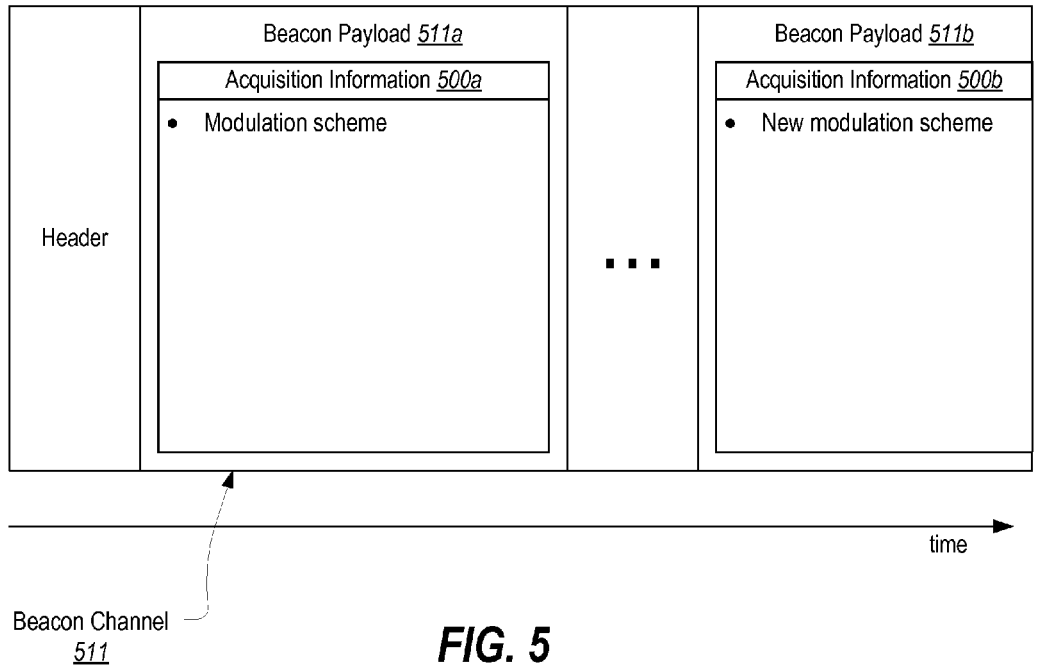

FIG. 5 illustrates another example of the type of traffic channel acquisition information that can be transmitted in the beacon channel. As shown, beacon channel 511 includes acquisition information 500a and acquisition information 500b. Acquisition information 500a includes the modulation scheme with which traffic channel 510 has been modulated for a first time period. Similarly, acquisition information 500b includes a new modulation scheme used to modulate traffic channel 510 for a second time period. Upon receiving the identification of the new modulation scheme, the receiver can update its parameters to ensure that traffic channel 510 is demodulated correctly. This modulation scheme information can be secured within the beacon channel by applying the CDM techniques of the present invention.

It is noted that any number of updated parameters can be transmitted in the beacon channel at any given time. For example, the beacon channel may contain PN code seeds at a first time, an FEC code at a second time, frequency, phase, and data rate information at a third time, a new PN code seed and modulation scheme at a fourth time, an encryption scheme at a fifth time, etc. In other words, the acquisition information contained in the beacon channel can include information for de-spreading the traffic channel as well as information for demodulating, decoding, or decrypting the traffic channel. Any of this sensitive information can be transmitted by the transmitter to the receiver in a secure way using the CDM techniques of the present invention.

Figure 6:
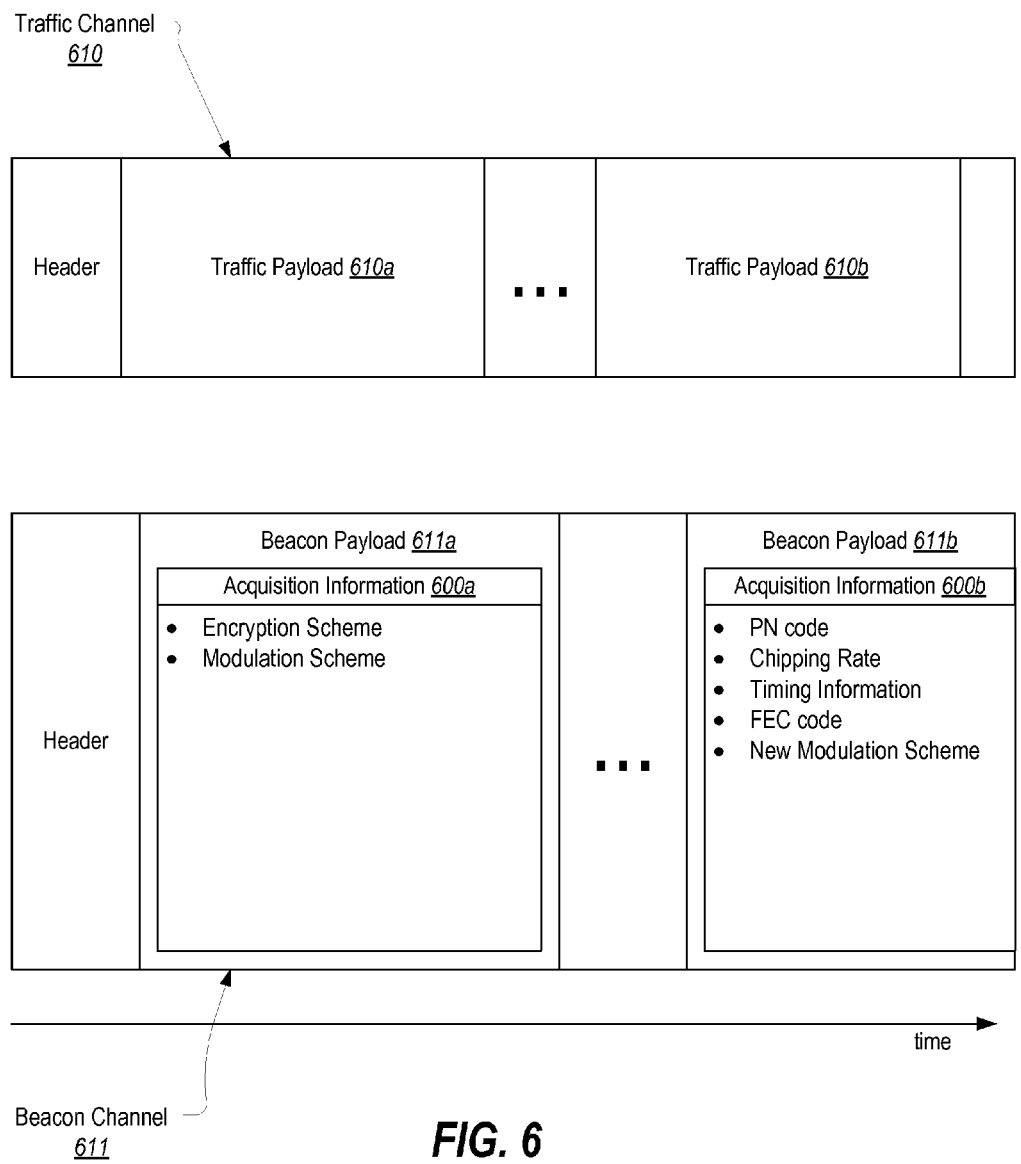
FIG. 6 illustrates an example of a CDM beacon channel that includes various updated parameters used to acquire a corresponding CDM traffic channel.

For example, FIG. 6 illustrates an example of a beacon channel 611 that includes acquisition information 600a and 600b for acquiring traffic channel 610. As shown, beacon channel 611 includes acquisition information 600a that defines an encryption scheme and modulation scheme that was used to generate traffic channel 610 at a first time. The receiver can use acquisition information 600a to acquire the corresponding portion of traffic channel 610 that was modulated using the updated parameters in acquisition information 600a. Then, at a later time, beacon channel 611 includes acquisition information 600b that defines a PN code, a chipping rate, timing information, an FEC code, and a new modulation scheme. The receiver can use acquisition information 600b to acquire the corresponding portion of traffic channel 610 that was modulated using the updated parameters in acquisition information 600b.

Figure 7:
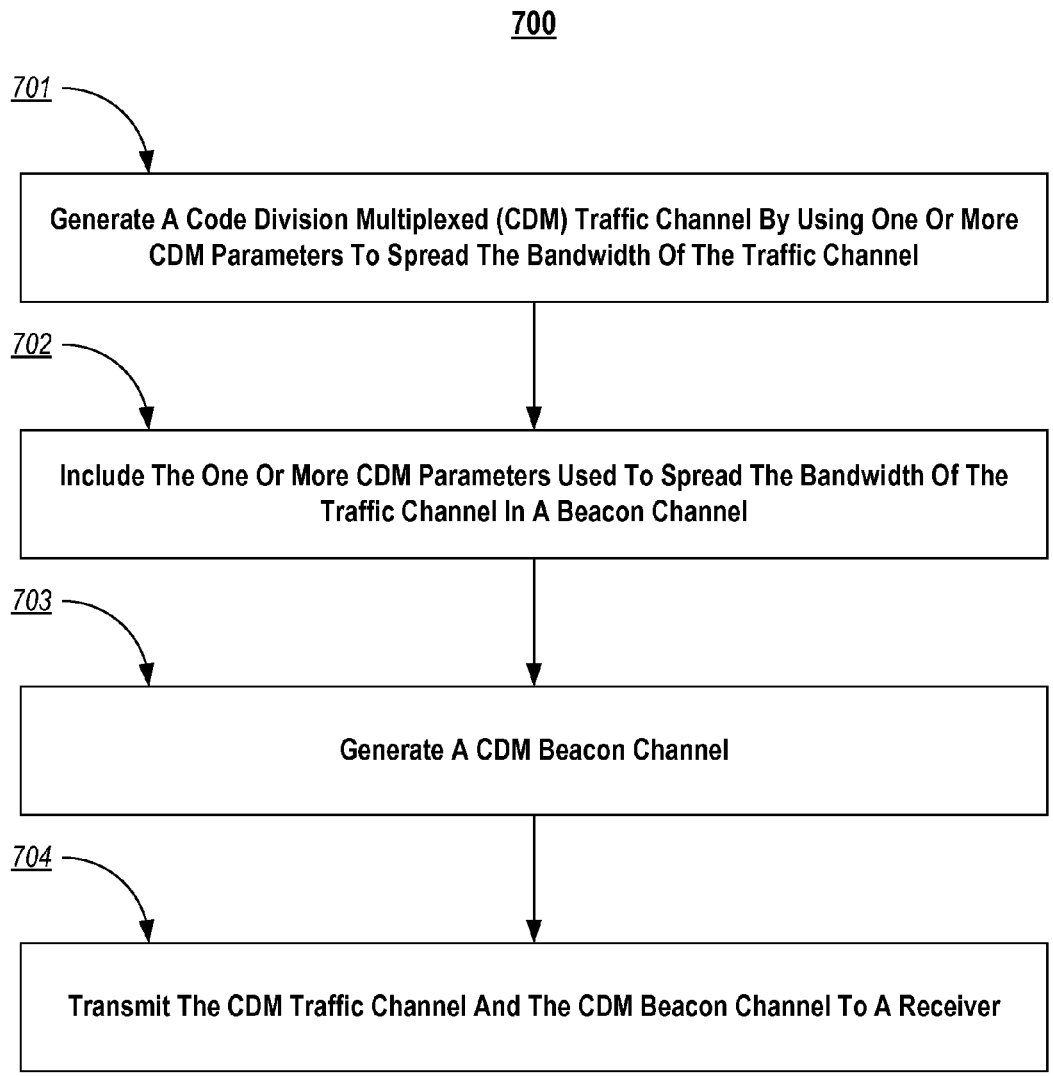
FIG. 7 illustrates a flow chart of an example method for code division multiplexing a traffic channel and a beacon channel that contains acquisition information for acquiring the traffic channel.

FIG. 7 illustrates a flowchart of an example method 700 for code division multiplexing a traffic channel and a beacon channel that contains acquisition information for acquiring the traffic channel. Method 700 will be described with reference to FIG. 1.

Method 700 includes an act 701 of generating a code division multiplexed (CDM) traffic channel by using one or more CDM parameters to spread the bandwidth of the traffic channel. For example, transmitter 101 can use one or more CDM parameters (e.g. DSSS parameters or parameters for another spread spectrum technique) to spread the bandwidth of traffic channel 110.

Method 700 includes an act 702 of including the one or more CDM parameters used to spread the bandwidth of the traffic channel in a beacon channel. For example, transmitter 101 can include the one or more CDM parameters in beacon channel 111.

Method 700 includes an act 703 of generating a CDM beacon channel. For example, transmitter 101 can spread beacon channel 111 using a spread spectrum technique such as DSSS.

Method 700 includes an act 704 of transmitting the CDM traffic channel and the CDM beacon channel to a receiver. For example, transmitter 101 can transmit traffic channel 110 and beacon channel 111 as CDM channels.

Figure 8:
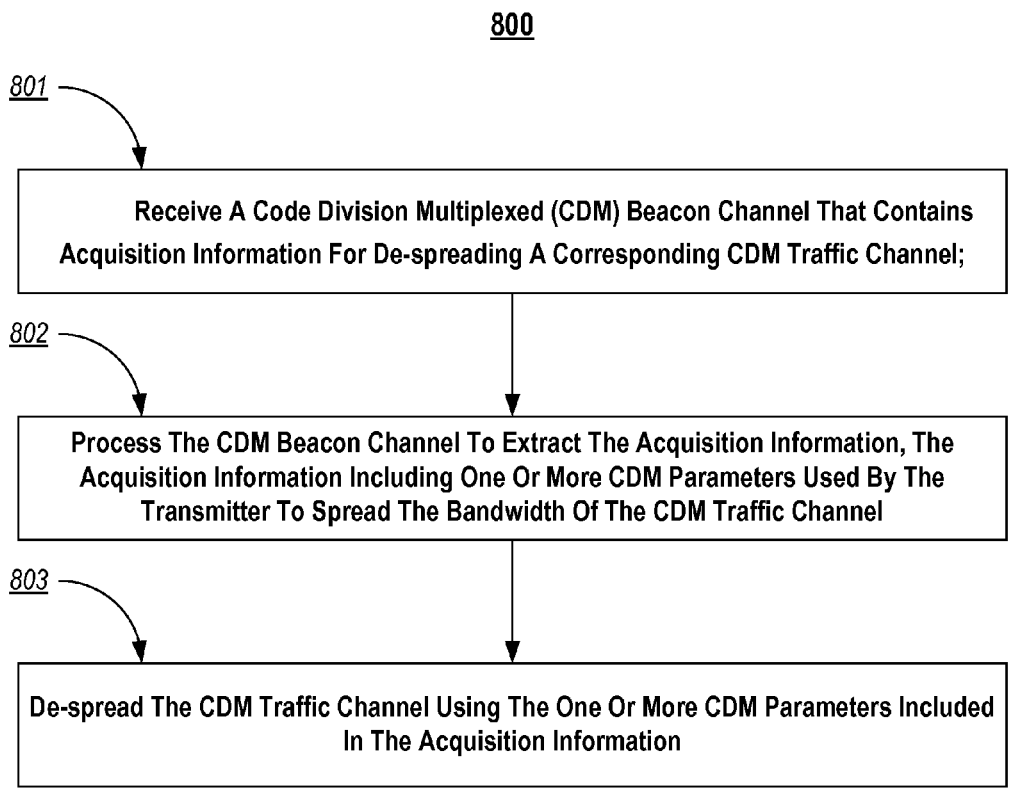
FIG. 8 illustrates a flow chart of an example method for extracting acquisition information from a code division multiplexed beacon channel to acquire a code division multiplexed traffic channel.

FIG. 8 illustrates a flowchart of an example method 800 for extracting acquisition information from a code division multiplexed beacon channel to acquire a code division multiplexed traffic channel. Method 800 will be described with reference to FIG. 1.

Method 800 includes an act 801 of receiving, from a transmitter, a code division multiplexed (CDM) beacon channel that contains acquisition information for de-spreading a corresponding CDM traffic channel. For example, receiver 102 can receive CDM beacon channel 111 that contains acquisition information for de-spreading traffic channel 110.

Method 800 includes an act 802 of processing the CDM beacon channel to extract the acquisition information, the acquisition information including one or more CDM parameters used by the transmitter to spread the bandwidth of the CDM traffic channel. For example, receiver 102 can extract one or more CDM parameters from beacon channel 111.

Method 800 includes an act 803 of de-spreading the CDM traffic channel using the one or more CDM parameters included in the acquisition information. For example, receiver 102 can use the one or more CDM parameters extracted from beacon channel 111 to de-spread traffic channel 110.

Although specific embodiments and applications of the invention have been described in this specification, these embodiments and applications are exemplary only, and many variations are possible.

We claim:

1. A method, performed by a transmitter, for code division multiplexing a traffic channel and a beacon channel that contains acquisition information for acquiring the traffic channel, the method comprising:
   generating a code division multiplexed (CDM) traffic channel by using one or more CDM parameters to spread the bandwidth of the traffic channel;
   including the one or more CDM parameters used to spread the bandwidth of the traffic channel in a beacon channel;
   generating a CDM beacon channel; and
   transmitting the CDM traffic channel and the CDM beacon channel to a receiver,
   wherein:
      the transmitting step comprises transmitting the CDM traffic channel at a first power level and the CDM beacon channel at a second power level that is less than the first power level, and
      a difference between the first power level and the second power level is a function of a processing gain of the CDM traffic channel and a signal to noise ratio of the CDM beacon channel.

2. The method of claim 1, wherein the one or more CDM parameters include a PN code seed of a PN code used to spread the bandwidth of the traffic channel.

3. The method of claim 2, wherein the one or more CDM parameters include timing information defining when the PN code is to be applied by the receiver to the CDM traffic channel to de-spread the traffic channel.

4. The method of claim 1, further comprising:
   prior to generating the CDM traffic channel, using one or more modulation parameters to modulate the traffic channel; and
   including the one or more modulation parameters in the beacon channel.

5. The method of claim 4, wherein the one or more modulation parameters comprise one or more of:
   an encryption scheme;
   a forward error correction code;
   a modulation scheme;
   a data rate;
   a carrier frequency; or
   an interleaving technique.

6. The method of claim 5, further comprising:
   updating one or more of the one or more CDM parameters or the one or more modulation parameters; and
   including the one or more updated parameters in the beacon channel.

7. The method of claim 1, further comprising encrypting the beacon channel.

8. The method of claim 1, wherein the transmitting the CDM traffic channel comprises transmitting the CDM traffic channel as a continuous stream of encoded traffic payloads constituting individual parts of a message transmission.

9. The method of claim 8 further comprising, while transmitting the CDM traffic channel, changing one or more encoding parameters by which the encoded traffic payloads are encoded.

10. The method of claim 9, wherein the transmitting the CDM beacon channel comprises:
 transmitting in the CDM beacon channel information corresponding to the encoding parameters, and
 upon the changing the one or more encoding parameters, changing the information transmitted in the CDM beacon channel to correspond to the changed encoding parameters.

11. The method of claim 10, wherein the changed encoding parameters comprise one or more of the CDM parameters.

12. A method, performed by a transmitter, for code division multiplexing a traffic channel and a beacon channel that contains acquisition information for acquiring the traffic channel, the method comprising:
 generating a code division multiplexed (CDM) traffic channel by using one or more CDM parameters to spread the bandwidth of the traffic channel;
 including the one or more CDM parameters used to spread the bandwidth of the traffic channel in a beacon channel;
 generating a CDM beacon channel; and
 transmitting the CDM traffic channel and the CDM beacon channel to a receiver,
 wherein:
 the CDM beacon channel is transmitted at a power level that is less than the power level at which the CDM traffic channel is transmitted, and
 the power level of the CDM beacon channel is given by the equation:

$$P_{BeaconChannel} = P_{TrafficChannel} - \left(10\log10(PG) - \frac{Eb}{No}\right)$$

where PG is the processing gain of the traffic channel and Eb/No is the signal to noise ratio of the beacon channel.

13. A method, performed by a receiver, for extracting acquisition information from a code division multiplexed beacon channel to acquire a code division multiplexed traffic channel, the method comprising:
 receiving, from a transmitter, a code division multiplexed (CDM) beacon channel that contains acquisition information for de-spreading a corresponding CDM traffic channel;
 processing the CDM beacon channel to extract the acquisition information, the acquisition information including one or more CDM parameters used by the transmitter to spread the bandwidth of the CDM traffic channel;
 de-spreading the CDM traffic channel using the one or more CDM parameters included in the acquisition information; and
 receiving the CDM traffic channel at a first power level, wherein:
 the receiving the CDM beacon channel comprises receiving the CDM beacon channel at a second power level that is less than the first power level, and
 a difference between the first power level and the second power level is a function of a processing gain of the CDM traffic channel and a signal to noise ratio of the CDM beacon channel.

14. The method of claim 13, wherein the one or more CDM parameters comprise a PN code seed of a PN code that was used to spread the traffic channel, and wherein de-spreading the CDM traffic channel comprises generating the PN code from the PN code seed and applying the PN code to the CDM traffic channel to de-spread the traffic channel.

15. The method of claim 14, wherein the one or more CDM parameters include timing information defining a time at which the PN code is to be applied to the CDM traffic channel to de-spread the traffic channel.

16. The method of claim 13, wherein the acquisition information includes one or more modulation parameters used by the transmitter to modulate the traffic channel, the method further comprising:
 processing the de-spread traffic channel using the one or more modulation parameters.

17. The method of claim 16 wherein the one or more modulation parameters comprise one or more of:
 an encryption scheme;
 a forward error correction code;
 a modulation scheme;
 a data rate;
 a carrier frequency; or
 an interleaving technique.

18. The method of claim 16, further comprising:
 at a later time, processing the CDM beacon channel to extract addition acquisition information, the additional acquisition information including one or more updated parameters of the one or more CDM parameters or the one or more modulation parameters; and
 processing the traffic channel using the one or more updated parameters.

19. The method of claim 13 further comprising receiving the CDM traffic channel as a continuous stream of encoded traffic payloads constituting individual parts of a message transmission.

20. The method of claim 19 further comprising, while receiving the continuous stream of encoded traffic payloads, receiving in the CDM beacon channel changed values of one or more encoding parameters by which the encoded traffic payloads are encoded at the transmitter.

21. The method of claim 20, wherein the changed encoding parameters comprise one or more of the CDM parameters.

22. A method, performed by a receiver, for extracting acquisition information from a code division multiplexed beacon channel to acquire a code division multiplexed traffic channel, the method comprising:
 receiving, from a transmitter, a code division multiplexed (CDM) beacon channel that contains acquisition information for de-spreading a corresponding CDM traffic channel;
 processing the CDM beacon channel to extract the acquisition information, the acquisition information including one or more CDM parameters used by the transmitter to spread the bandwidth of the CDM traffic channel; and
 de-spreading the CDM traffic channel using the one or more CDM parameters included in the acquisition information,
 wherein the power level of the received CDM beacon channel is given by the equation:

$$P_{BeaconChannel} = P_{TrafficChannel} - \left(10\log10(PG) - \frac{Eb}{No}\right)$$

where PG is the processing gain of the traffic channel and Eb/No is the signal to noise ratio of the beacon channel.

23. A transmitter for code division multiplexing a traffic channel and a beacon channel that contains acquisition information for acquiring the traffic channel, the transmitter comprising:

an antenna for transmitting a code division multiplexed (CDM) traffic channel and a CDM beacon channel to a receiver; and circuitry for generating the CDM traffic channel and the CDM beacon channel by:

generating the CDM traffic channel by using one or more CDM parameters to spread the bandwidth of a traffic channel;

including the one or more CDM parameters used to spread the bandwidth of the traffic channel in a beacon channel; and generating the CDM beacon channel, wherein:

the circuitry is further for generating the CDM traffic channel at a first power level and the CDM beacon channel at a second power level that is less than the first power level, and a difference between the first power level and the second power level is a function of a processing gain of the CDM traffic channel and a signal to noise ratio of the CDM beacon channel.

24. The transmitter of claim 23, wherein the circuitry is further for generating the CDM traffic channel as a continuous stream of encoded traffic payloads constituting individual parts of a message transmission.

25. The transmitter of claim 24, wherein the circuitry is further for:

while generating the CDM traffic channel, changing at least one of the one or more CDM parameters, and thereafter including the changed CDM parameters in the beacon channel.

26. A receiver for extracting acquisition information from a code division multiplexed beacon channel to acquire a code division multiplexed traffic channel, the receiver comprising:

an antenna for receiving a code division multiplexed (CDM) traffic channel and a CDM beacon channel from a transmitter; and circuitry for de-spreading the CDM traffic channel by:

processing the CDM beacon channel to extract acquisition information for de-spreading the CDM traffic channel, the acquisition information including one or more CDM parameters used by the transmitter to spread the bandwidth of the CDM traffic channel; and de-spreading the CDM traffic channel using the one or more CDM parameters included in the acquisition information, wherein:

the circuitry is further for receiving the CDM traffic channel at a first power level and the CDM beacon channel at a second power level that is less than the first power level, and a difference between the first power level and the second power level is a function of a processing gain of the CDM traffic channel and a signal to noise ratio of the CDM beacon channel.

27. The receiver of claim 26, wherein the circuitry is further for receiving the CDM traffic channel as a continuous stream of encoded traffic payloads constituting individual parts of a message transmission.

28. The receiver of claim 27 wherein the circuitry is further for:

while receiving the continuous stream of encoded traffic payloads, receiving in the CDM beacon channel a changed value of the one or more CDM parameters, and thereafter de-spreading the CDM traffic channel using the changed value of the one or more CDM parameters.

* * * * *